Figure 1:
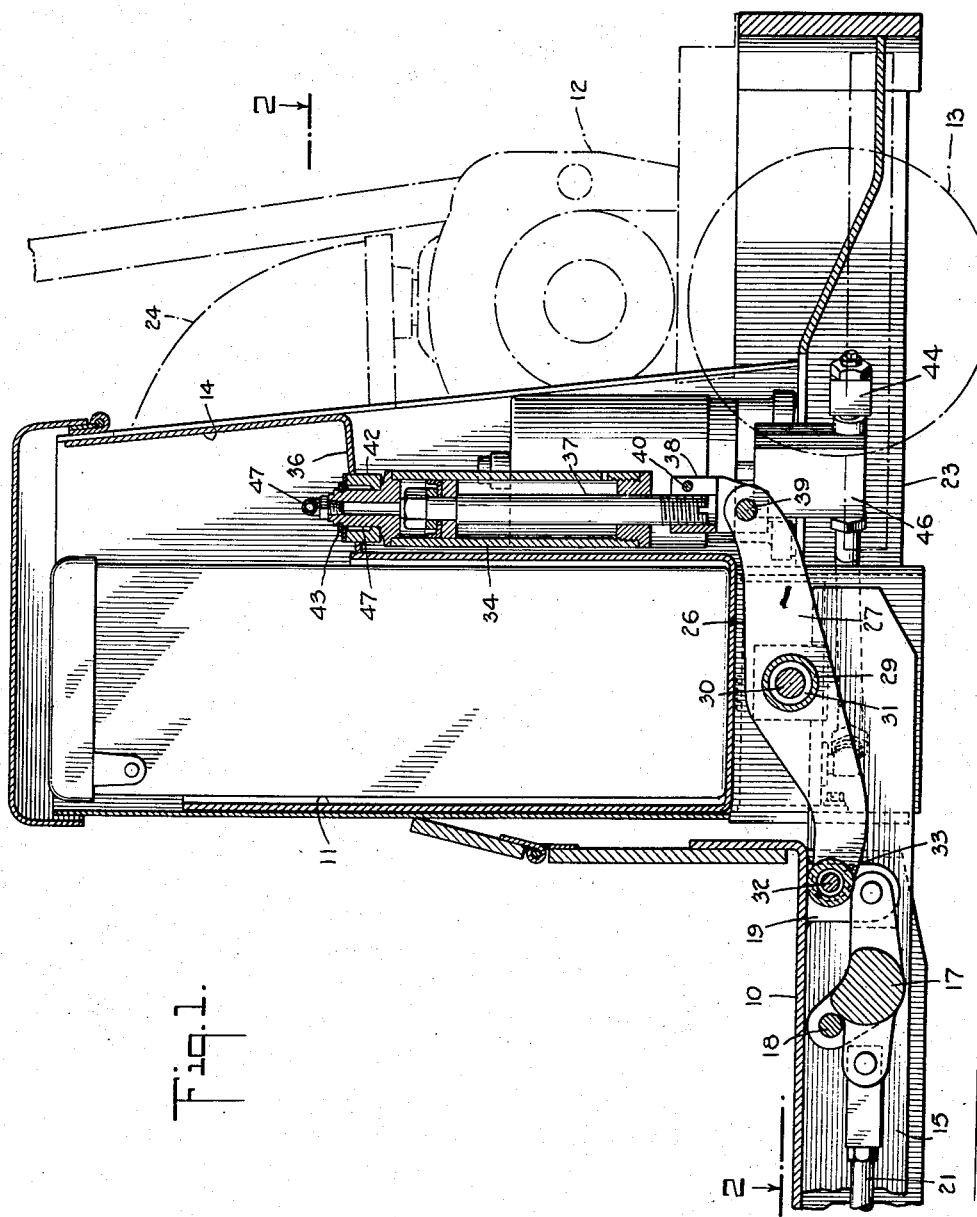

Nov. 2, 1954

G. F. QUAYLE 2,693,339

LIFTING MECHANISM FOR INDUSTRIAL TRUCKS

Filed Jan. 4, 1951

2 Sheets-Sheet 1

INVENTOR
G. F. Quayle
BY
A. H. Golden
ATTORNEY

Nov. 2, 1954  G. F. QUAYLE  2,693,339
LIFTING MECHANISM FOR INDUSTRIAL TRUCKS
Filed Jan. 4, 1951  2 Sheets-Sheet 2

INVENTOR
G. F. Quayle
BY
A. H. Golden
ATTORNEY

United States Patent Office 2,693,339
Patented Nov. 2, 1954

2,693,339

LIFTING MECHANISM FOR INDUSTRIAL TRUCKS

George F. Quayle, Philadelphia, Pa., assignor to The Yale & Towne Manufacturing Company, Stamford, Conn., a corporation of Connecticut Application January 4, 1951, Serial No. 204,306

2 Claims. (Cl. 254—8)

This invention relates to motorized industrial hand trucks and more particularly to trucks of this class known as low lift platform trucks.

Trucks of this class are provided with an elevating platform which may be introduced beneath a skid or other load by maneuvering the truck, and a hydraulic power mechanism for lifting the platform into supporting engagement with the skid so that the skid may be transported by the truck. Because of the low position of the elevating platform at the rear of the truck, it is necessary to locate other essential parts of the truck forwardly of the platform and it has therefore been customary to place the steering head at the front end of the truck and the battery compartment between the steering head and the platform. This arrangement obviously requires that the truck be considerably longer than the platform itself.

It is important, however, that the length of trucks of the class described be kept at a minimum in view of the fact that they must be capable of maneuvering easily in congested areas of warehouses and other places. Even a small decrease in the length of the trucks will greatly increase their utility and will permit added efficiency in the use of floor space.

Although previous attempts to make the trucks more compact have placed the hydraulic platform lifting mechanism below the battery compartment, the lifting mechanism occupied more space longitudinally of the truck than did the battery compartment and prevented the steering head from being located as close to the compartment as might be desired, thus contributing to the length of the truck.

As an important feature of my invention, therefore, I provide a truck of the class described in which no portion of the length of the truck may be attributed to the platform lifting mechanism, so that the truck may be shorter than was heretofore possible without requiring a sacrifice in the length of the load platform. This is accomplished by mounting the lifting ram or rams upon the standard at the front of the battery compartment in positions laterally outward of the steering head. The lifting lever is constructed in a particular manner to avoid the steering head which may then be located as closely as may be desired to the front of the battery compartment, and all portions of the lifting mechanism will occupy spaces that occur incidentally to a compact arrangement of other parts of the truck. My novel construction does in fact make more space available for the lifting mechanism than heretofore, despite the fact that the truck as a whole is decreased in length, and consequently it is possible to construct the lifting mechanism upon a larger and more efficient scale.

I have thus outlined rather broadly the more important features of my invention in order that the detailed description thereof that follows may be understood, and in order that my contribution to the art may be better appreciated. There are of course, additional features of my invention that will be described hereinafter, and which will form the subject of the claims appended hereto. Those skilled in the art will appreciate that the conception on which my disclosure is based may readily be utilized as a basis for the designing of other structures for carrying out the several purposes of my invention. It is important, therefore, that the claims to be granted me shall be of sufficient breadth to prevent the appropriation of my invention by those skilled in the art.

Figure 2:
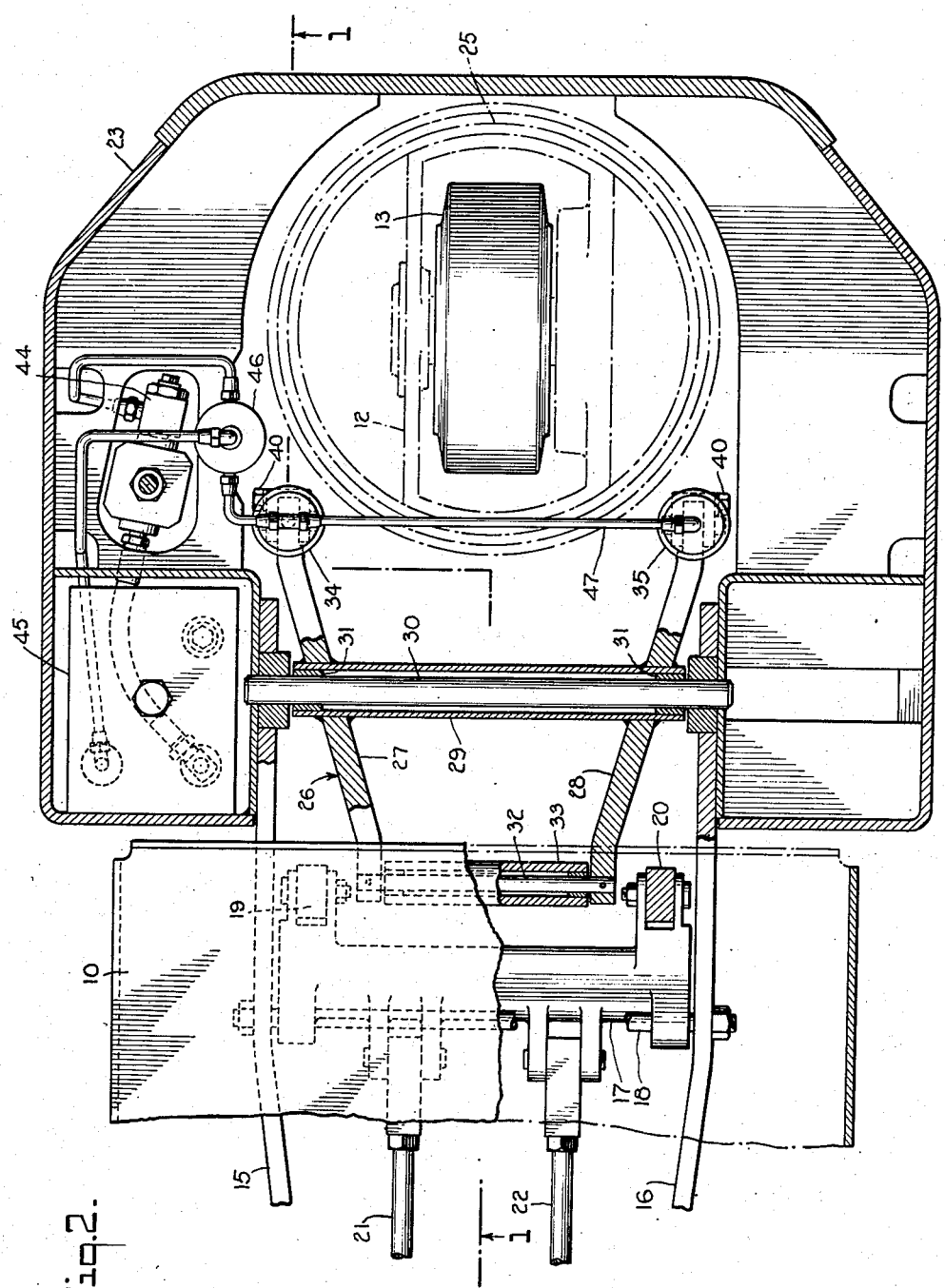

Referring now to the drawings, Fig. 1 is a sectional elevation of a front portion of a motorized hand truck embodying my invention, taken substantially upon the broken line 1—1 of Fig. 2, showing the lifting mechanism and also indicating the steering head in broken lines.

Fig. 2 is a sectional plan view of the same taken substantially upon the line 2—2 of Fig. 1, the steering head being indicated in broken lines.

As is customary in trucks of this general class, a load elevating platform 10 is located upon a rear portion of the truck behind a battery compartment 11, and a steering head 12 having a motor driven traction wheel 13 is located forwardly of a standard 14 at the front of the battery compartment. The construction and operation of the traction wheel is not part of my invention and is old in the art, being well illustrated in the patent to Schroeder, No. 2,399,605 dated April 30, 1946, and assigned to The Yale & Towne Manufacturing Company, the assignee of this application. In describing my invention, I shall show a platform type truck, but it should be understood that my invention is equally applicable to a pallet lift truck, the distinction being that in a platform truck the main frame extends under the platform, while in a pallet truck the main frame is very short and does not extend substantially under the platform.

The frame of the truck may be of welded construction and comprises a pair of rearwardly extending main frame members 15, 16, which support the load platform 10 for lifting and lowering movement by means of any suitable linkage. As shown, this linkage comprises a rigid twin lever 17 pivotally mounted upon a transverse shaft 18 between the frame members 15, 16, and pivotally connected to a pair of depending lugs 19, 20, at the front of the platform 10, whereby the platform will be laterally constrained to a level position with respect to the frame members 15, 16, while being permitted a substantial up and down movement. The rear end of the platform 10 may be mounted by a similar twin lever arrangement (not shown) operated in synchronism with the twin lever 17 by a pair of tension rods 21, 22, pivotally attached to rearwardly extending arms on said lever 17.

The battery compartment 11 and the standard 14 are mounted upon the rearwardly extending legs of a U-shaped front frame 23 integrally secured to front end portions of the frame members 15, 16, below said battery compartment. The standard 14 carries a bearing bracket 24 which serves as an upper pivotal support for the steering head 12, while the lower portion of the steering head is held in proper vertical alignment during its turning movements by suitable bearing means such as a turntable 25 in the front frame 23 (Fig. 2).

In the trucks of the class described which were provided heretofore, the lifting mechansim for elevating the load platform has accounted for a certain portion of the length of the truck. In my invention, however, the lifting mechanism is not confined to a longitudinal position in the truck, and results in a shorter truck because it is not a factor in determining the truck length. As shown in the drawings, my novel platform truck is provided with a lifting mechanism which comprises a lifting lever 26 mounted below the battery compartment 11 and extending into a certain lapping relationship to the platform 10 and the steering head 12, thus offering no obstruction to the most compact arrangement of the platform, the compartment, and the steering head.

The lifting lever 26 is constructed as a pair of lever members 27, 28 of reversed but otherwise identical shape, the central portions of these members being integrally connected by a substantially rigid torsion tube 29 extending through them and providing a passage for a pivot shaft 30. The torsion tube 29 is provided with suitable bearings 31 whereby the lifting lever 26 is swingable upon the pivot shaft 30, the latter being mounted at its ends in the truck frame members 15, 16, at a central location transversely below the battery compartment 11.

The lifting lever members 27, 28 extend rearwardly beneath a front portion of the elevating platform 10, where they are connected by a horizontal shaft 32 carrying a roller 33 adapted to engage and exert an upward thrust against the lower surface of the platform 10. The front ends of the lever members are located forwardly of the battery compartment 11 laterally outward and adjacent opposite sides of the steering head 12, said members being divergent in a forward direction, thus avoiding any conflict with the steering head which is located close to the front of the battery compartment 11.

In order to operate the lifting lever 26, provision is made of a pair of hydraulic lifting rams 34, 35 located in substantially vertical alignment with the front ends of the lever members 27, 28. The lifting rams 34, 35 are supported by attachment at their upper ends to a transverse ledge 36 which forms a part of the standard 14 at the front of the battery compartment 11, the plungers 37 of the rams extending downwardly and being connected to the front ends of the lever members 27, 28 by clevises 38 having cross-pins 39. Preferably the plungers 37 have a screw threaded connection with the clevises 38, the upper portions of which are split and provided with clamping screws 40, thus providing for longitudinal adjustment of the plungers 37 with respect to the lever members.

A slight angular movement of the rams 34, 35 is permitted in order to accommodate the action of the lifting lever 26, the upper ends of the rams being provided with necks 41 having a slight freedom of movement in seating rings 42 mounted in the ledge 36. The thrusting action of the rams 34, 35 will cause them to react against the rings 42, while separation of the rams from the seating rings will be prevented by suitable detent washers 43 interlocked with the upper ends of the necks 41.

This lifting rams 34, 35 are operated by fluid under pressure from any suitable source, as for example a motor driven pump 44 supplied with fluid from a reservoir tank 45 through a valve 46. Although the specific features of the hydraulic system do not form a part of my invention, the fluid pressures in the two rams 34, 35 will, however, be equalized by a connecting conduit 47 whereby the rams will accept equal shares of the load when the platform 10 is elevated.

It is believed that the advantages and operation of my improved lift truck will be apparent from the foregoing description. Certain modifications may be made by those skilled in the art, however, without departing from the spirit of the invention. The lifting mechanism may, for example, be operated by only one of the rams, the other ram being omitted and the operating force being transmitted from one lever member to the other through the torsion tube 29. When two lifting rams are used, the torsion tube 29 will insure equal movements of the lever members so that the lifting roller 33 will exert a uniform thrust upon the elevating platform 10. It is also within the scope of the invention to so proportion the lifting lever 26 that the pivot shaft 30 and the torsion tube 29 are located further forwardly or rearwardly in order to provide the lifting mechanism with a different mechanical advantage, as may be desired, these variations being made possible by my novel construction which in effect provides the truck with a much greater space for receiving the lifting mechanism than was heretofore available. In any event, the lifting mechanism no longer interferes with the arrangement of other parts of the truck, thus permitting trucks of the class described a higher efficiency in operation because of their reduced length.

I now claim:

1. In a truck of the class described, a lifting head, a powered traction and steering wheel mounted at the forward end of said lifting head to support said lifting head, a vertical battery compartment at the rear end of said lifting head and rearwardly of said powered traction and steering wheel containing the battery to power said powered traction and steering wheel, an elevating platform rearwardly of said battery compartment, means mounting said elevating platform for lifting movement relatively to said lifting head, a ram mounted on said lifting head in juxtaposed relation to the forward surface of said battery compartment for substantially vertical extension and contraction, a lifting lever, means pivoting said lever relatively to said lifting head on a horizontal axis directly under said battery compartment, one end of said lever extending rearwardly linearly under said battery compartment and beyond said battery compartment to a point under said elevating platform, means on said end of the lever in rolling engagement with said elevating platform to impart lifting movement to said elevating platform, the other end of said lever extending linearly under said battery compartment to a point beyond the forward surface of said compartment, and means pivoting the said other end of said lever to one end of said ram.

2. In a truck of the class described, a lifting head, a powered traction and steering wheel mounted at the forward end of said lifting head to support said lifting head, a vertical battery compartment supported on said lifting head a short distance above the ground rearwardly of said powered traction and steering wheel and containing the battery to power said powered traction and steering wheel, an elevating platform rearwardly of said battery compartment, means mounting said elevating platform for lifting movement relatively to said lifting head, a ram, means mounting said ram on said lifting head in a position forwardly of said battery compartment, a lifting lever, means pivoting said lever relatively to said lifting head on a horizontal axis directly under said battery compartment, one end of said lever extending rearwardly linearly in the relatively small space between said battery compartment and the ground to a point under said elevating platform, a roller on said end of the lever applied to the underside of said elevating platform to impart lifting movement to said elevating platform, the other end of said lever extending forwardly linearly in the relatively small space upper said battery compartment, and a pivot through which said ram acts on the said other end of said lever at a point forwardly of said battery compartment.

References Cited in the file of this patent

UNITED STATES PATENTS

| Number | Name | Date |
|---|---|---|
| 2,121,764 | Quayle | June 21, 1938 |
| 2,325,396 | Hastings, Jr. | July 27, 1943 |
| 2,369,854 | Quayle | Feb. 20, 1945 |
| 2,422,538 | Framhein | June 17, 1947 |
| 2,623,756 | Elliott et al. | Dec. 30, 1952 |

FOREIGN PATENTS

| Number | Country | Date |
|---|---|---|
| 76,962 | Sweden | Dec. 13, 1930 |